United States Patent [19]

Park

[11] Patent Number: 5,001,555
[45] Date of Patent: Mar. 19, 1991

[54] STEREOSCOPIC TELEVISION BROADCASTING SYSTEM AND A STEREOSCOPIC TELEVISION RECEIVER

[75] Inventor: Hong C. Park, Seoul, Rep. of Korea
[73] Assignee: Goldstar Co., Ltd., Seoul, Rep. of Korea
[21] Appl. No.: 330,799
[22] Filed: Mar. 30, 1989

[30] Foreign Application Priority Data

Mar. 31, 1988 [KR] Rep. of Korea ............... 3617/1988

[51] Int. Cl.⁵ .................... H04N 13/00; H04N 15/00
[52] U.S. Cl. ........................................ 358/88; 358/3; 358/92; 350/130
[58] Field of Search ............. 358/88, 89, 90, 91, 358/92, 3; 350/130

[56] References Cited

U.S. PATENT DOCUMENTS

| | | | |
|---|---|---|---|
| 4,431,265 | 2/1984 | Benton | 358/88 |
| 4,562,463 | 12/1985 | Lipton | 358/88 |
| 4,649,425 | 3/1987 | Pund | 358/88 |
| 4,791,478 | 12/1988 | Tredwell et al. | 358/88 |

Primary Examiner—John K. Peng

[57] ABSTRACT

A stereoscopic television broadcasting system is provided which can televise the stereoscopic broadcasting of the left video and right video through two channels at the broadcasting station by inserting stereoscopic program data, left/right data and frequency data into the vertical retrace line intervals of the left video signal and the right video signal. A stereoscopic television receiver is provided which can display a stereoscopic picture thereon according to the broadcasting system, which includes a data separator for separating information data from the output signal of a tuner and outputting frequency data, stereoscopic data and left/right data therefrom, a tuning controller for generating a channel selection signal from the frequency data, a stereoscopic program data identifier and a right data identifier each for identifying the stereoscopic program data and left/right data of the separator, and an auxiliary circuit.

11 Claims, 2 Drawing Sheets

STEREOSCOPIC TELEVISION BROADCASTING SYSTEM AND A STEREOSCOPIC TELEVISION RECEIVER

BACKGROUND OF THE INVENTION

The present invention relates to a stereoscopic television broadcasting system which includes a stereoscopic video and a stereoscopic television receiver for displaying a stereoscopic picture thereon according to the broadcasting system thereof, and more particularly to a stereoscopic television broadcasting system and a stereoscopic television receiver which are compatible with the existing television receiver.

The fundamental concept of the stereoscopic video system is that the left and right eyes of a viewer observe an object at a slightly different angle of vision. Accordingly, when taking a picture of an object which is intended to be shown to a viewer in a video system, two cameras are located at left and right visual angles for taking a picture.

At this time, assuming that a pictorial image to be seen on the left is a left video and a pictural image to be seen on the right is a right image, at a point of view for indicating stereoscopic video on a screen, the left eye must see only the left video and the right eye must see only the right video.

For this purpose, in the existing picture theaters a stereoscopic movie has been put on the screen by the method as illustrated in FIG. 1. That is to say, the left video of a left projector 1 and the right video of the right projector 2 are projected on a screen 5 through the first and second polarizers 3 and 4, respectively. At this moment, a viewer can see the stereoscopic movie by the video on the screen 5 through a left eye polarizer 6 and a right eye polarizer 7. Both of the polarized 6 and 7 have the same directions of the polarization of light as the first and second polarizers 3 and 4.

In the above system, because the polarization direction of the right eye polarizer 7 is different than the direction of the first polarizer 3 by an angle of 90° it is not possible to see the left video. Similarly, the left eye polarizer 6 has the polarization direction which is different than the direction of the second polarizer 4 by an angle of 90°, and thereby it is not possible to see the right video.

Accordingly, a viewer who puts on the left eye and right eye polarizers 6 and 7 can feel the video displayed on the screen 5 stereoscopically.

Another known stereoscopic video system, illustrated in FIG. 2, provides a video which can be seen stereoscopically by a viewer by reproducing a magnetic tape in which a stereoscopic video is recorded with a video cassette tape recorder to display the stereoscopic video on a screen of a television receiver.

In this system, a video tape in which a left video and a right video are recorded in turn, is reproduced by a video cassette tape recorder 11 and the stereoscopic video reproduced by the video cassette tape recorder 11 is applied to a Braun tube 12 of a television receiver. When the left video is displayed on the Braun tube 12, a left eye LCD (liquid crystal display) shutter 13 is opened and a right eye LCD shutter 14 is placed in a closed state so that the left eye can only see the left video. While the right video is displayed on the Braun tube 12, the left eye LCD shutter 13 is placed in a closed state and the right eye LCD shutter 14 is placed in an open state so that the right eye can only see the right video.

However, in the above-mentioned conventional system, as the left or right video is developed on the television receiver, a separate auxiliary circuit for controlling the spectacles of the left eye shutter or the right eye shutter is required. Because the spectacles for the shutters are connected to the television receiver, the number of the televiewers is limited. Furthermore, since the left video and the right video on the television receiver vary in turn, flickering is produced and one side of the LCD shutters is placed in a closed state in turn so that the whole brightness of the screen seems to be dark.

SUMMARY OF THE INVENTION

Accordingly, the object of the present invention is to provide a stereoscopic television broadcasting system which can televise the stereoscopic broadcasting of the left video, and the right video at the broadcasting station by utilizing two channels and a stereoscopic television receiver which can display stereoscopically the stereoscopic video broadcasting signals which are transmitted in accordance with the stereoscopic broadcasting system.

In a stereoscopic video broadcasting, it is required to transmit and receive two kinds of video signals, i.e. left and right video signals. Accordingly, two kinds of RF (radio frequency) signals are to be transmitted through two moments, it is necessary to inform the television receiver whether a video signal being output from one channel is a left video signal or a right video signal and which channel outputs another video signal. The above information data to be informed to the television receiver are transmitted as digital signals during the vertical retrace line interval and a television receiver receives the information data. Thereafter an operation suitable for the information data is executed.

This information data which should be transmitted from the television broadcasting station during the vertical retrace line interval of the video signals are explained hereinafter.

Stereoscopic program data is the information data which represents whether a program being broadcasted in the present channel (assuming "M" channel) is a stereoscopic one or not. In the case where the stereoscopic data is "1" a stereoscopic broadcasting is indicated, while in the case where the stereoscopic data is "0" the broadcasting indicated as not being stereoscopic.

The left and right data (R/L) is the information data which informs whether the video signal being transmitted in the channel M is the left video or the right video in the case where the stereoscopic program data is "1". At this moment, when the video signal is a right video, the signal becomes a right data (R) which is represented with ASCII code (American Standard Code for Information Interchange). When the signal is a left video, the signal becomes a left data (L) represented with ASCII code.

Furthermore, a frequency data is the information data of the channel which transmits the video signal of the other side of the present channel M. In the case where the stereoscopic program data is "1", the television is informed of the frequency (or a channel number) of the channel M provided that a user selected a channel M under the state that the channel M transmits a right video signal and a channel N transmits a left video signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
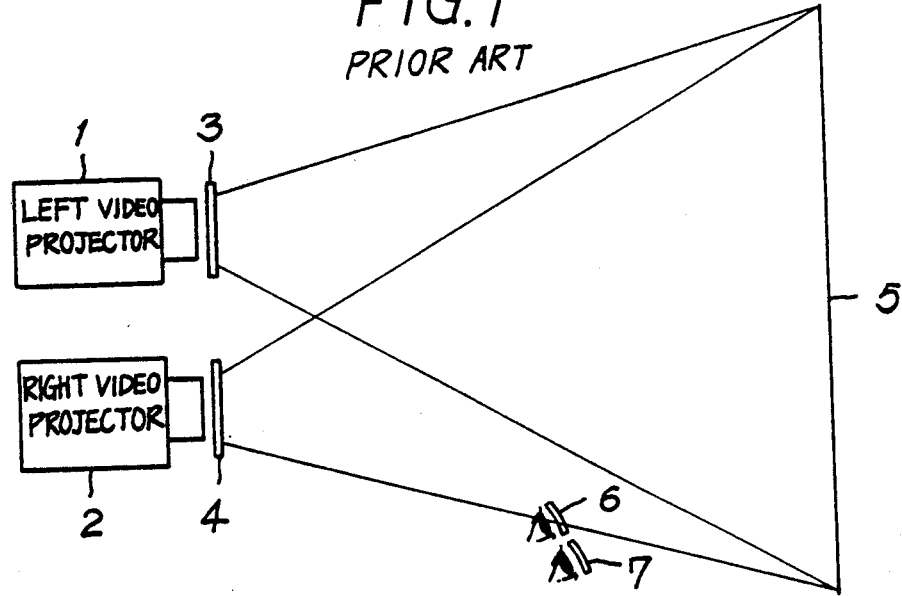
FIG. 1 is an explanatory view illustrating the principles of a conventional stereoscopic movie system.
Figure 2:
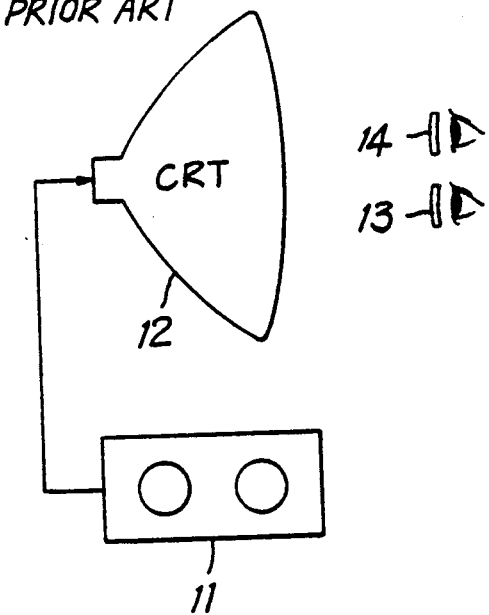
FIG. 2 is an explanatory view illustrating the principles of a conventional stereoscopic television.
Figure 3:
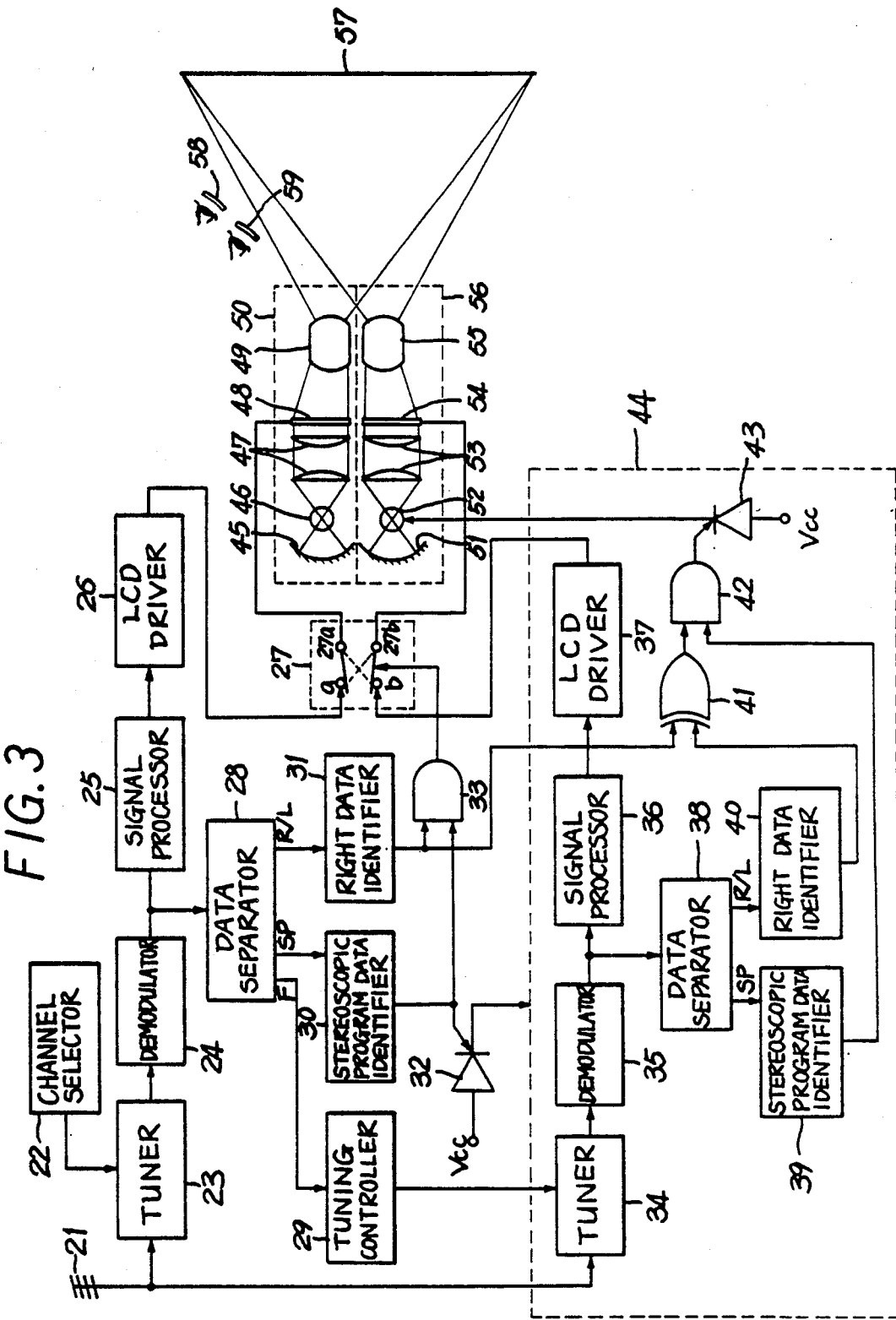
FIG. 3 is a circuit diagram illustrating a stereoscopic television receiver according to an embodiment of the present invention.

Referring to FIG. 3 a circuit diagram is illustrated for receiving the video signal being transmitted by the stereoscopic braodcasting system according to an embodiment of the present invention. As illustrated in FIG. 3 the circuit is constituted in a manner such that an output of a first tuner 23, which is connected with an antenna 21 and a channel selector 22, is connected to a first demodulator 24, a first signal processor 24, a first LCD driver 26 and a fixed contact(a) of a switch 27. The ouput of the first demodulator 24 is connected to an input of a first data separator 28 whose frequency data terminal (F), stereoscopic program data terminal (SP) and left/right terminal (R/L) are connected with the inputs of each of the tuning controller 29, the first stereoscopic program data indentifier 30 the first right data identifier 31, respectively. The output of the first stereoscopic program data identifier 30 is connected to a gate of a thyristor 32 and is also connected together with the first right data identifier 31 to a control terminal of the switch 27 through an AND gate 33. With the output of the of the tuning controller 29 is connected to a second tuner 34, which is connected with the antenna 21, and the output of the second tuner 34 is connected to a second demodulator 35, a second signal processor 36 and a second LCD driver 37 to the fixed contact (b) of the switch 27. The output of the second demodulator 35 is connected to an input of a second data separator 38 whose stereoscopic program data terminal (SP) and left/right data terminals (R/L) are connected with the inputs of a second stereoscopic program data identifier 39 and a second right data identifier 40, respectively. The outputs of the first and second data identifiers 40 and 31 are connected through an exclusive-OR gate 41 and again through an AND gate 42 together with the output of the second stereoscopic program data identifier 39 to a gate of a thyristor 43. The movable terminals 27a and 27b of the switch 27 are connected to a left polarizer 48 of a left optical system 50 and to right polarized 54 of a right optical system 56. The left optical system 50 consists of a reflecting mirror 45, a light source 46, lenses 47, the left polarizer 48 and an LCD 49. The right optical system 56 consists of a reflecting mirror 51, a light source 52, lenses 53, the right polarizer 54 and an LCD 55. The cathode of the thyristor 32 is connected to a power input of an auxiliary circuit 44 which consists of the tuner 34, a thyristor 43 and other components. The cathode of the thyristor 43 is connected to the power input of the light source 52 of the right optical system 56.

In the above embodiment the switch 27 is designed in a manner such that when a low level is applied to the control terminal thereof the movable terminals 27a and 27b are shorted to the fixed contacts (a) and (b), respectively and when a high level is applied thereto, the movable terminals 27a and 27b are shorted to the fixed terminals (b) and (a), respectively. The left and right polarizers 48 and 54 are designed in a manner such that the directions of the polarization of light thereof are maintained at an angle of 90° therebetween.

In FIG. 3 the elements 57 represents a television screen, and elements 58 and 59 represent left eye and right eye polarizers whose directions of light polarization are identical to those of the left and right polarizers 48 and 49.

The operation and effect of the present embodiment as constructed above are described in detail hereinafter.

Upon the selection of the channel by manipulating the channel selector 22, the RF signal of the selected channel among the broadcasting signals received through the antenna is tunned by the first tuner 23. The RF signal, which is tuned and output from the first tuner 23, is demodulated in the first demodulator 24 and modified in the first signal processor 25, and thereafter applied through the first LCD driver 26 to the fixed terminal (a) of the switch 27. At this moment, the output signal of the first demodulator 24 is applied to the first data separator 28, so that information data is separated and outputted therefrom.

At this moment, the case where the broadcasting is not a stereoscopic one, information data does not exist during the vertical retrace line interval of the video signal, so that information data is not output from the frequency data terminal (F), the stereoscopic program data terminal (SP) and the left/right data terminal (R/L) of the first data separator 28. Thereby, a low level signal is output from the first stereoscopic program data identifier 30 to turn the thyristor 32 off and the power is not supplied to the auxiliary circuit 44. Because a low level is outputted from the AND gate 33 and is applied to a control terminal of the switch 27, the movable terminals 27a and 27b are shorted to the fixed contacts (a) and (b), respectively.

Accordingly, the signal, which is applied through the first LCD driver 26 to the fixed terminal (a) of the switch 27, is applied through the movable terminal 27a of the switch 27 to the left polarizer 48 of the left optical system 50. As a result, the video signal is displayed on the television screen 57 similarly to the existing LCD television.

However, in case where the broadcasting is a stereoscopic one, information data exists in the output signal of the first demodulator 24, so that the information data is separated by the first data separator 28 to output the frequency data, the stereoscopic program data and the left/right data through the data terminal (F), (SP) and (R/L) thereof, respectively. These output signals are applied to the tuning controller 29, the first stereoscopic program data identifier 30 and the first right data identifier 31, respectively.

Accordingly, at this moment a high level signal is output from the first stereoscopic program data identifier 30 to turn the thyristor 32 on, so that the power is applied to the auxiliary circuit 44. The high level signal, which is output from the first stereoscopic program data identifier 30, is applied to an input terminal of the AND gate 33.

Furthermore, in the tuning controller 29, the channel is selected according to the frequency data upon the control of the second tuner 34. Thus, the RF signal of the selected channel among the received broadcasting signals through the antenna 21 is tuned and outputted from the second tuner 34. The RF signal from the second tuner 34 is demodulated by the second demodulator 35, modified by the second signal processor 36 and then applied through the second LCD driver 37 to the fixed terminal (b) of the switch 27.

At this moment, the stereoscopic program data and the left/right data are separated from each other by the second data separator 38. Thereafter, the stereoscopic program data and the left/right data are output to the terminals (SP) and (R/L) and then applied to the second stereoscopic program data identifier 39 and the second right data identifier 40.

Accordingly, a high level signal is applied from the second stereoscopic program data identifier 39 to one side input terminal of the AND gate 42.

On the other hand, in the case where the video signal being output from the first demodulator 24 is a left video signal and the video signal being output from the second demodulator 35 is a right one, a low level signal is output from the first right data identifier 31 and a high level signal is output from the second right data identifier 40 and then applied to the other side input terminal of the AND gate 42. At that moment, since a high level signal, which is output from the second stereoscopic program data identifier 39, is being applied to one side input terminal of the AND gate 42, a high level signal is output from the AND gate 42 to turn the thyristor 43 on. As result, a power is applied through the thyristor 43 to the light source 52 to driving the right optical system 56. At this moment, a low level signal is output from the AND gate 33 so that the movable terminals 27a and 27b of the switch 27 are shorted to the fixed contacts (a) and (b) thereof.

As a result, the left video signal, which is applied through the first LCD driver 26 to the fixed contact (a), and the right video signal, which is applied through the second LCD driver 37 to the fixed contact (b) of the switch 27, pass through the movable terminals 27a and 27b of the switch 27 and are processed by the left and right optical system 50 and 56 and then indicated on the television screen 57. Consequently, will seem stereoscopic to the viewer by viewing the televsion screen 57 with the spectacles of the left eye polarizer 58 and the right eye polarizer 59.

On the other hand, in the case where the video signal, which is output from the first demodulator 24, is a right one and the video signal, which is output from the second demodulator 34, is a left one, a high level signal is output from the first right data identifier 31 and a low level signal is output from the second right data identifier 40. As a result, a high level signal is output from the exclusive-OR gate 41 to drive the right optical system 56 as described above and a high level signal is applied from the AND gate 33 to a control terminal of the switch 27. So thereby, the movable terminals 27a and 27b of the switch 27 are shorted, repectively, to the fixed contacts (a) and (b) thereof.

Accordingly, the right video signal, which is applied through the first LCD driver 26 to the fixed contact (a) of the switch 27, and the left video signal, which is applied through the LCD driver 37 to the fixed contact (b) of the switch 27, pass through the movable terminals 27b and 27a of the switch 27, respectively, and are processed by the right optical system 56 and left optical system 50 and then indicated on the television screen 57. At this moment, the video will seem stereoscopic to the viewer by viewing the television screen 57 with the spectacles of the left and right eye polarizers 58 and 59.

As described above in detail, the present invention has the advantages that it is possible to enjoy the video in a television receiver stereoscopically by transmitting the stereoscopic video signal through two channels at the broadcasting station and that the signals will be compatable with the existing television broadcasting system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stereoscopic television receiver, comprising:
  a first tuner for tuning a broadcasting signal received by an antenna in response to a first channel selection signal from a channel selector;
  a first demodulator for demodulating the output signal from said tuner;
  a first data separator for separating information data from the output signal of said first demodulator and outputting frequency data, stereoscopic program data and left/right data therefrom;
  a tuning controller for generating a second channel selection signal from said frequency data of said first data separator;
  a first sterepscoic program data identifier for identifying said stereoscopic program data from said first data separator;
  a first right data identifier for identifying said left/-right data from said first data separator;
  an AND gate for logically combining the output signal from said first stereoscopic program data identifier with the output signal from said first right data identifier;
  a second tuner for tuning said broadcasting signal being received at said antenna by said channel selection signal from said tuning controller;
  a second demodulator for demodulating the output signal from said second tuner;
  first and second signal processors and for processing the respective output signals from said first and second demodulators and;
  first and second for outputting the output signals from said first and second signal processors as first and second LCD driving signals respectively;
  a switch for selecting the output signals from said first and second LCD drivers in response to the output signal from said AND gate; and
  left and right optical system for indicating the signals being output to first and second movable terminals of said switch on a television screen after converting the signals into video signals.

2. A stereoscopic television receiver as claimed in claim 1, wherein the directions of light polarization from a left polarizer of said left optical system and a right polarizer of said right optical system are maintained at an angle of 90° therebetween.

3. A stereoscopic television receiver as claimed in claim 1, wherein a second data separator is connected to the output of said second demodulator and a second stereoscopic program data identifier and a second right data identifier are connected to the output of said second data separator so that power is supplied to a light source of said right optical system when said stereoscopic program data is identified by said second stereoscopic program data identifier and said right data is identified by said second right data identifier or said first right data identifier.

4. A stereoscopic television receiver as claimed in claim 1 or claim 3, wherein power is supplied to an auxiliary circuit comprising said second tuner, and said second right data identifier when said stereoscopic program data is identified by said first stereoscopic program data identifier.

5. A stereoscopic television receiver comprising:
  video receiving means for developing first and second video signals from a broadcasting receiver through an antenna;
  first information data processing means for developing an identification signal for stereoscopic program data and right data after separating stereoscopic program data and left/right data from information data contained in a vertical retrace line interval of said broadcasting signal;
  video changeover switch driving means for developing a switching signal in response to said identification signal for said stereoscopic program data and said right data being developed from said first information data processing means; and
  switching means for selectively applying said first and second video signals from said video receiving means to left and right LCD panels of left and right optical systems respecfively in response to said switching signal being outputted from said video changeover switch driving means.

6. The stereoscopic television receiver as claimed in claim 5, further comprising a tuning controller disposed between said first information data processing means and said video receiving means for tuning said video receiving means in response to frequency data outputted from said first data processing means.

7. The stereoscopic television receiver as claimed in claim 5, wherein the directions of light polarization from said left LCD panel of said left optical system and said right LCD panel of said right optical system are maintained in a perpendicular direction with respect to each other.

8. The stereoscopic television receiver as claimed in claim 5 or 7, further comprising a video receiver power controller for applying power to said video receiving means in response to said identification signal of said stereoscopic program data output from said first information data processing means whereby power to said video receiving means for developing said second video signal is cut off during mono-broadcasting.

9. The television receiver as claimed in claim 5, wherein said video receiving means comprises:
  first and second tuners for tuning said broadcasting signal in response to a channel selection signal; 1 first and second deomdulators for demodulating the output signals of said first and second tuners;
  first and second signal processing means for developing synchronization and video signals from the output signals of said first and second demodulators; and
  first and second LCD drivers for driving said left and right LCD panels in response to said synchronization and video signals from said first and second signal processing means.

10. The stereoscopic receiver as claimed in claim 5 or 9, further comprises:
  second information data processing means for separating said stereoscopic program data and said left/right data from said information data and developing said identification signal from said stereoscopic program data and said right data; and
  a light source controller for supplying power to said right optical system from said identification signal of said stereoscopic program data of said second information data processing means and said identification signal of said right data of said first and second information data processing means.

11. A stereoscopic television broadcasting system comprising:
  processing means for processing a video signal into stereoscopic program data, left/right data and frequency data, said stereoscopic program data being processed when said video signal is transmitting said stereoscopic broadcasting television program, said left/right data being processed when a video signal is transmitting left and right video signals and said frequency data being processed when said video signal is being outputted from first and second channels of said stereoscopic broadcasting television program into vertical retrace line intervals of said left and right video signals; and
  display means for displaying said video signal corresponding to said stereoscopic program data, said left/right data and said frequency data processed by said processing means.

* * * * *